(12) United States Patent
Swaine

(10) Patent No.: US 11,853,226 B2
(45) Date of Patent: Dec. 26, 2023

(54) ADDRESS TRANSLATION CACHE WITH USE OF PAGE SIZE INFORMATION TO SELECT AN INVALIDATION LOOKUP MODE, OR USE OF LEAF-AND-INTERMEDIATE EXCLUSIVE RANGE-SPECIFYING INVALIDATION REQUEST, OR USE OF INVALIDATION REQUEST SPECIFYING SINGLE ADDRESS AND PAGE SIZE INFORMATION

(71) Applicant: ARM LIMITED, Cambridge (GB)

(72) Inventor: Andrew Brookfield Swaine, Sheffield (GB)

(73) Assignee: Arm Limited, Cambridge (GB)

( * ) Notice: Subject to any disclaimer, the term of this patent is extended or adjusted under 35 U.S.C. 154(b) by 374 days.

(21) Appl. No.: 16/624,430

(22) PCT Filed: May 15, 2018

(86) PCT No.: PCT/GB2018/051314
§ 371 (c)(1),
(2) Date: Dec. 19, 2019

(87) PCT Pub. No.: WO2019/025748
PCT Pub. Date: Feb. 7, 2019

(65) Prior Publication Data
US 2020/0218665 A1    Jul. 9, 2020

(30) Foreign Application Priority Data
Jul. 31, 2017   (GB) ..................................... 1712251

(51) Int. Cl.
*G06F 12/00*    (2006.01)
*G06F 12/1036*  (2016.01)
(Continued)

(52) U.S. Cl.
CPC ...... *G06F 12/1036* (2013.01); *G06F 12/0864* (2013.01); *G06F 12/0882* (2013.01);
(Continued)

(58) Field of Classification Search
CPC ............. G06F 12/1036; G06F 12/0864; G06F 12/0882; G06F 12/0891; G06F 12/1009; G06F 2212/651
See application file for complete search history.

(56) References Cited

U.S. PATENT DOCUMENTS

| 5,764,944 A  | 6/1998 | Hwang et al. |
| 9,594,680 B1 | 3/2017 | Bussa et al. |

(Continued)

FOREIGN PATENT DOCUMENTS

| CN | 105980994 | 9/2016 |
| GB | 2 365 167 | 2/2002 |

(Continued)

OTHER PUBLICATIONS

International Search Report and Written Opinion of the ISA for PCT/GB2018/051314, dated Jun. 27, 2018, 24 pages.

(Continued)

*Primary Examiner* — Arvind Talukdar
(74) *Attorney, Agent, or Firm* — NIXON & VANDERHYE P.C.

(57) ABSTRACT

An apparatus has an address translation cache (12, 16) having a number of cache entries (40) for storing address translation data which depends on one or more page table entries of page tables. Control circuitry (50) is responsive to an invalidation request specifying address information to perform an invalidation lookup operation to identify at least one target cache entry to be invalidated. The target cache entry is an entry for which the corresponding address translation data depends on at least one target page table (Continued)

entry corresponding to the address information. The control circuitry (50) selects one of a number of invalidation lookup modes to use for the invalidation lookup operation in dependence on page size information indicating the page size of the target page table entry. The different invalidation lookup modes correspond to different ways of identifying the target cache entry based on the address information.

17 Claims, 6 Drawing Sheets

(51) Int. Cl.
- *G06F 12/0864* (2016.01)
- *G06F 12/0882* (2016.01)
- *G06F 12/0891* (2016.01)
- *G06F 12/1009* (2016.01)

(52) U.S. Cl.
CPC ...... *G06F 12/0891* (2013.01); *G06F 12/1009* (2013.01); *G06F 2212/651* (2013.01); *G06F 2212/657* (2013.01)

(56) References Cited

U.S. PATENT DOCUMENTS

| | | | |
|---|---|---|---|
| 2006/0181909 A1 | 8/2006 | Hinojosa et al. | |
| 2007/0143565 A1 | 6/2007 | Corrigan et al. | |
| 2013/0212313 A1* | 8/2013 | Cota-Robles | G06F 9/30076 711/6 |
| 2014/0156930 A1* | 6/2014 | Isloorkar | G06F 12/1027 711/122 |
| 2014/0325167 A1 | 10/2014 | Slegel et al. | |
| 2015/0242319 A1* | 8/2015 | Evans | G06F 12/109 711/207 |
| 2015/0269077 A1 | 9/2015 | Lee et al. | |
| 2016/0140042 A1 | 5/2016 | Mukherjee | |
| 2016/0306746 A1 | 10/2016 | Podaima et al. | |
| 2016/0342524 A1 | 11/2016 | Eddy | |
| 2017/0371789 A1* | 12/2017 | Blaner | G06F 12/1009 |

FOREIGN PATENT DOCUMENTS

| | | |
|---|---|---|
| JP | 06-139149 | 5/1994 |
| JP | 2017-517040 | 6/2017 |

OTHER PUBLICATIONS

Combined Search and Examination Report for GB1712251.6, dated Jan. 23, 2018, 7 pages.
Office Action for JP Application No. 2020-503733 dated Apr. 27, 2022 and English translation, 4 pages.
Office Action for CN Application No. 201880049493.4 dated Mar. 13, 2023 and English translation, 29 pages.

* cited by examiner

ADDRESS TRANSLATION CACHE WITH USE OF PAGE SIZE INFORMATION TO SELECT AN INVALIDATION LOOKUP MODE, OR USE OF LEAF-AND-INTERMEDIATE EXCLUSIVE RANGE-SPECIFYING INVALIDATION REQUEST, OR USE OF INVALIDATION REQUEST SPECIFYING SINGLE ADDRESS AND PAGE SIZE INFORMATION

This application is the U.S. national phase of International Application No. PCT/GB2018/051314 filed 15 May 2018, which designated the U.S. and claims priority to GB Patent Application No. 1712251.6 filed 31 Jul. 2017, the entire contents of each of which are hereby incorporated by reference.

The present technique relates to the field of data processing. More particularly it relates to caching of address translation data.

A data processing system may have at least one address translation cache for caching address translation data used for translating addresses for memory system accesses. The address translation data in the cache may depend on page table entries of one or more page tables which are stored in the memory system itself. By caching the address translation data in the address translation cache, addresses can be translated faster than if the page tables had to be looked up from memory every time an address translation is required. If a change is made to the page tables (for example an operating system may change the memory mapping being used for a given software process or context) then an invalidation request may be sent to the address translation cache to invalidate at least one target cache entry of the address translation cache which provides address translation data which depends on the page table entry that changed.

At least some examples provide an apparatus comprising:
an address translation cache comprising a plurality of cache entries, each cache entry to store address translation data dependent on one or more page table entries of one or more page tables stored in a memory system; and
control circuitry responsive to an invalidation request specifying address information corresponding to at least one target page table entry, to perform an invalidation lookup operation to identify at least one target cache entry of the address translation cache for which the address translation data is dependent on said at least one target page table entry, and to trigger invalidation of the address translation data stored in said at least one target cache entry;
wherein the control circuitry is configured to select which of a plurality of invalidation lookup modes to use for the invalidation lookup operation in dependence on page size information indicative of a page size of said at least one target page table entry, the plurality of invalidation lookup modes corresponding to different ways of identifying said at least one target cache entry in dependence on the address information.

At least some examples provide a method for invalidating address translation data from an address translation cache comprising a plurality of cache entries, each cache entry to store address translation data dependent on one or more page table entries of one or more page tables stored in a memory system, the method comprising:
in response to an invalidation request specifying address information corresponding to at least one target page table entry:
performing an invalidation lookup operation to identify at least one target cache entry of the address translation cache for which the address translation data is dependent on said at least one target page table entry, wherein which of a plurality of invalidation lookup modes is used for the invalidation lookup operation is selected in dependence on page size information indicative of a page size of said at least one target page table entry, the plurality of invalidation lookup modes corresponding to different ways of identifying said at least one target cache entry in dependence on the address information; and
triggering invalidation of the address translation data stored in said at least one target entry.

At least some examples provide an apparatus comprising:
an address translation cache comprising a plurality of cache entries, each cache entry to store address translation data dependent on one or more page table entries of one or more page tables stored in a memory system, wherein each page table entry comprises one of:
an intermediate page table entry specifying an address of a next level page table entry; and
a leaf page table entry specifying an address translation mapping; and
control circuitry responsive to a leaf-and-intermediate exclusive range-specifying invalidation request identifying range information indicative of an invalidation range of addresses, to trigger invalidation of at least one target cache entry of the address translation cache for which the address translation data is dependent on at least one target page table entry, said at least one target page table entry comprising any leaf page table entries of a given page table and any intermediate page table entries of said given page table which correspond to a group of addresses lying entirely within said invalidation range.

At least some examples provide an apparatus comprising:
an address translation cache comprising a plurality of cache entries, each cache entry to store address translation data; and
control circuitry responsive to an invalidation request specifying a single address and page size information indicative of a page size associated with a page table entry corresponding to said single address, to perform an invalidation lookup operation to identify at least one target cache entry of the address translation cache in dependence on the single address and the page size information, and to trigger invalidation of the address translation data stored in said at least one target cache entry.

Further aspects, features and advantages of the present technique will be apparent from the following description of examples, which is to be read in conjunction with the accompanying drawings, in which:

FIG. 1 schematically illustrates an example of a data processing system having at least one address translation cache;

Figure 1:
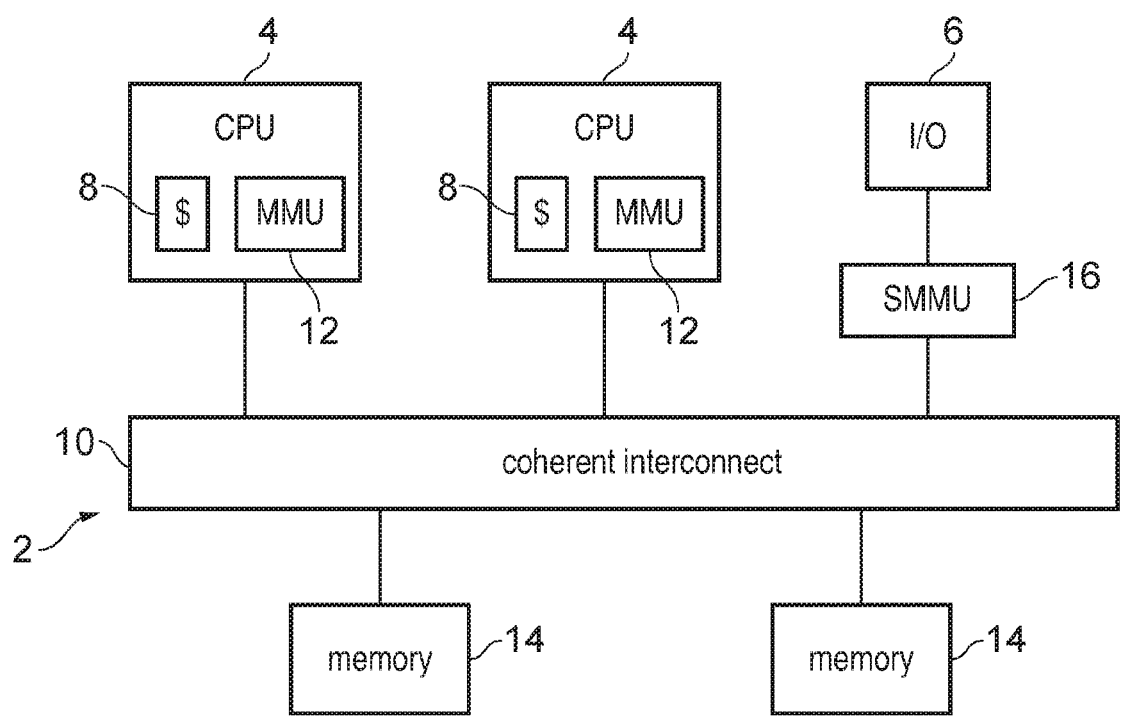

An address translation cache may have a number of cache entries and each cache entry may store address translation data which depends on one or more page table entries from one or more page tables stored in a memory system. In some address translation caches each entry may correspond to just one page table entry of the page tables in memory. However, it is also possible for a given cache entry to provide address translation data which depends on two or more page table entries of the page tables. For example, this could be because one cache entry may store combined address translation corresponding to multiple stages of address translation. Invalidation requests may be used to remove address translation data from the address translation cache when corresponding page table entries on which those cache entries depend have changed. An invalidation request may specify address information corresponding to at least one target page table entry, and this may trigger control circuitry of the address translation cache to perform an invalidation lookup operation to identify at least one target cache entry for which the address translation data depends on the at least one target page table entry, and to invalidate the address translation data stored in the at least one target cache entry. The invalidation lookup information depends on the address information, but could also depend on other information which may vary depending on the particular implementation. For example, the cache entries may store additional information, such as an indication of a size of the block of addresses corresponding to that entry, and/or a context identifier such as a virtual machine identifier or stream identifier, which can be used to determine whether a given cache entry should be invalidated in response to the invalidation request.

In some address translation caches, there may be a number of invalidation lookup modes corresponding to different ways of performing the invalidation lookup operation to locate the required target cache entry to be invalidated. In some cases two or more of the invalidation lookup modes may be performed for the same invalidation request. Some of the invalidation lookup modes may be more expensive to perform in terms of latency and power consumption than others. The inventor recognised that whether a given invalidation lookup mode is required may depend on the page size of the page table entry which is targeted by a given invalidation request. For some page sizes, not all of the invalidation lookup modes may be required. Hence, the control circuitry may select which of a plurality of invalidation lookup modes to use for the invalidation lookup operation based on page size information associated with the invalidation request, which is indicative of a page size of the at least one target page table entry. By considering page size information, unnecessary invalidation lookup modes can be omitted, or a more informed decision of whether to use a more expensive or less expensive lookup mode can be made. This can improve performance in handling invalidations from the address translation cache.

In one example, the invalidation lookup modes may comprise a cache indexing mode and a cache walk mode. In the cache indexing mode, the invalidation lookup operation comprises indexing into at least one selected cache entry of the address translation cache selected based on the address information, and determining whether each selected cache entry is one of the at least one target cache entry. In the cache walk mode, the invalidation lookup operation may comprise accessing at least a subset of cache entries of the address translation cache selected independently of the address information, and determining whether each accessed cache entry is one of said at least one target cache entry. The control circuitry may select which of the cache indexing mode and cache walk mode to use based on the page size information.

Some forms of invalidation request may specify a single target address which would normally be expected to map onto one entry of the address translation cache, and so only one hit may be expected in response to the invalidation lookup. The cache indexing mode can be used for such invalidation requests, to access a set of one or more entries selected based on the address information, and determine whether each of the selected cache entries is the target cache entry that is required, without needing to check every entry within the cache. For example, the at least one selected cache entry may correspond to a set of multiple entries in a set-associative cache implementation or could correspond to one entry in a direct mapped cache structure.

However, some caches may support multiple cache entries depending on the same page table entry (e.g. if entries from different stages of address translation are combined into a single cache entry). If more than one entry can hit against the address information for a given invalidation request, then the cache walk mode can be used to step through a portion of the cache and identify all the possible entries which may need to be invalidated. In some cases, the cache walk mode may walk through all the entries in the entire cache storage. However, it is also possible for the cache walk mode to target just a subset of the cache entries, if it is known that other portions of the cache cannot store the required data. The cache walk mode may be more expensive in terms of performance and power consumption than the cache indexing mode, because rather than indexing into specific entries based on the specified address information, an entire portion of the cache may be accessed regardless of the address, and so a greater number of cache entries may need to be accessed. Typically, in caches which support multiple cache entries hitting for the same invalidation request, the control circuitry would switch to the cache walk mode as soon as there is any risk that such entries could be present. However, this can mean that all invalidation requests may be processed using the cache walk mode which can be very slow especially for larger address translation caches.

The examples below recognise that whether the cache walk mode is actually required may depend on the size of the page table entry targeted by the invalidation request. For example, when the page size is smaller than a threshold size there may be no risk of multiple entries mapping onto the same address, and so the cache indexing mode may be selected, while the cache walk mode may be selected when the page size information indicates that the page size is greater than the threshold size. In the case when the page size is equal to the threshold size, then either the cache indexing mode or the cache walk mode could be selected depending on the particular level at which the threshold is set. Hence, by selecting the cache invalidation lookup mode based on the page size information, unnecessary full cache walks can be avoided.

Some systems may provide multiple stages of address translation, with a first stage translating from first addresses to second addresses and a second stage translating from second addresses to third addresses. Processing circuitry may configure a stage 1 page table for controlling translation of the first addresses into the second addresses and may configure a stage 2 page table for controlling translation of the second addresses into the third addresses. For example, the first addresses may be virtual addresses specified by program instructions executed by the processing circuitry, which may be mapped to intermediate physical addresses under control of the stage 1 page table. The stage 1 page table may be configured by an operating system for example. However, to support virtualisation the hypervisor may provide further address translations in a stage 2 page table which map the intermediate physical addresses to physical addresses which are actually used by the memory system.

While some implementations may provide separate cache entries (in a shared cache or separate caches) for stage 1 and stage 2 respectively, performance on address translation lookups can be improved by storing combined address translation data in the cache for translating first addresses (virtual addresses) directly into the third addresses (physical addresses), bypassing the second addresses. However, in this case each combined entry may depend on at least one stage 1 page table entry and on at least one stage 2 page table entry. The stage 1 and stage 2 page tables may be defined with different page sizes which can mean that multiple cache entries may each correspond to the same stage 1 page table entry or stage 2 page table entry. This can mean that an invalidation targeting entries corresponding to a given page table entry of a larger size may need to invalidate multiple cache entries each corresponding to a smaller block of addresses.

For a cache supporting caching of combined stage 1/stage 2 address translation data, the technique discussed above can be particularly useful, because rather than requiring a cache walk mode for all invalidation requests which target a cache storing combined stage 1 and stage 2 address translation data the cache walk mode can be used when the page table size is large enough that there is a risk of the corresponding target page table entry being fragmented across multiple cache entries. When the page size is smaller than the threshold at which the larger pages start to be fragmented across multiple cache entries, the cache indexing mode can be selected. Hence, performance for invalidations can be improved by avoiding unnecessary full cache walks.

Another example where multiple cache lookup modes may be used can be in address translation caches which store address translation data for translating blocks of addresses having one of a number of different block sizes supported by the address translation cache. For example, some page tables may be defined with variable page size, so that different page table entries may correspond to different sized blocks of addresses. Also, some address translation caches may cache entries for multiple levels of a multi-level page table, in which case entries corresponding to the different levels may correspond to different sized blocks of addresses. If it is possible for different cache entries to correspond to different sized blocks of addresses, then the cache may perform multiple invalidation lookup operations for the same invalidation request, using different invalidation lookup modes each corresponding to a different block size. For example the different lookup modes may use different numbers of bits of the input address to generate an index for accessing the cache. Size information stored in each cache entry may be used to determine whether a given cache entry matches against the target address for a given lookup mode.

Performing each of the different invalidation lookup modes for different block sizes can be expensive in terms of performance and power consumption and can delay processing of invalidation requests. The examples discussed below recognise that when page size information is known, enabling deductions on the size of the page table entry targeted by the invalidation request, then this can be used to limit which cache indexing modes are actually required. For example, if the page size information is smaller than a given threshold then there may be no need to provide cache indexing modes associated with block sizes greater than that page size. Hence, in response to the invalidation request, control circuitry may select a subset of the cache indexing modes based on the page size information, and may perform one or more invalidation lookup operations corresponding to the selected subset of cache indexing modes. By avoiding unnecessary invalidation lookup modes, this enables performance to be improved for invalidations from the address translation cache.

The page size information may be represented in a number of different ways. In general, the page size information may be specified by the invalidation request, for example by including within the encoding of the request a parameter identifying the page size information. For example, the page size information may comprise at least one of an explicit indication of the page size; an upper bound for the page size; a lower bound for the page size; an indication of whether the page size is less than a threshold size; an indication of whether the page size is greater than a threshold size; start and end addresses of an address translation range specified by the address information; information identifying a subset of applicable page sizes selected from a plurality of page sizes; and an indication of one of a plurality of stages of address translation associated with the invalidation request.

Hence, it is not necessary for the page size to be explicitly identified. It can be enough that the page size may be identified imprecisely, for example with the information merely indicating whether the page size is greater or less than a threshold size or providing an upper or lower bound for the page size, rather than specifying the actual page size explicitly.

Also, in some cases the page size information may be implicit from other information. For example, some invalidation requests may specify a range of addresses for triggering invalidation of cache entries corresponding to one or more pages whose addresses fall at least partially within the range. For some forms of range-based invalidations (e.g. an exclusive range-specifying invalidation request), an upper bound for the page size may be implicit from the size of the range, and so there would be no need to specify page size information separately.

Another option may be that invalidation requests specify a bitmap with bits set for a certain subset of a page sizes selected from multiple page sizes supported. Depending on which bits of the bit map are set, the control circuitry can determine which page sizes may apply and limit the invalidation lookup modes accordingly. For example although in general the page tables could be defined with multiple different page sizes, if it is known that a given page size has not been used in any of the page tables, then the corresponding bit could be left clear to indicate that it is not necessary to perform a lookup operation based on that page size when performing invalidations from the address translation cache.

In another example, the page size information may be implicit from information specifying which stage of address translation is associated with the invalidation request. For example, with multiple stages of address translation, each stage could be associated with a fixed page size and so if an invalidation targets stage 1, then this may effectively indicate a corresponding page size, and similarly for stage 2. Even if a given stage's page tables support variable page sizes, some page sizes may only be supported by one of stage 1 and stage 2, so specifying which stage is to be affected by the invalidation can allow some possible page sizes to be eliminated.

The techniques discussed above can be used for a number of different types of invalidation request. In one example an address-specifying invalidation request may specify a single address to identify the at least one target page table entry corresponding to the address translation data to be invalidated. With a single address-specifying invalidation request, it would normally be expected that it is not required to identify any page size information, since implicitly any page table entry which corresponds to that address would be invalidated regardless of the size of that page (assuming it also meets any additional non-address based criteria, such as a matching translation context identifier). Typically, the address may simply identify a corresponding page of the address space which is mapped to a single page table entry in the page tables and this may trigger a corresponding invalidation of the relevant data in the address translation cache. Therefore, the skilled person would not see any need to specify the size of the page being invalidated. However, the inventor recognises that specifying the page size information for a single address-specifying invalidation requests enables cache lookups to be performed more efficiently, for example by eliminating use of the cache walk mode or enabling a subset of cache indexing modes to be omitted as discussed above. For example, the page size information could be an explicit indication of the page size, or a code representing the page size from one of multiple options. However, an efficient encoding can simply provide a single bit flag which may indicate whether or not the page size is greater or less than a particular threshold size (with the case where the page size is equal to the threshold size being represented with either value of the bit flag depending on implementation choice). Simply indicating whether the page size is greater or less than the threshold size may be enough to enable the selection between the cache walk mode and cache indexing mode as discussed above. Hence, the page size information does not require a significant expansion in the number of bits associated with the invalidation request.

Another form of invalidation request is a range-specifying invalidation request which may specify an invalidation range of addresses and which targets at least one target page table entry which corresponds to a group of addresses lying at least partially within the invalidation range. The range-specifying invalidation request may be an inclusive range-specifying invalidation request, for which the control circuitry triggers invalidation of cache entries which depend on at least one target page table entry which corresponds to a group of addresses for which any part of the group of addresses lies within the invalidation range. For an inclusive range-based invalidation, a page table entry is targeted even if it only partially maps onto the specified range.

Alternatively, the range-specifying invalidation request may be an exclusive range-specifying invalidation request, for which the control circuitry triggers invalidation such that the targeted cache entries are those entries which depend on page table entries which correspond to a group of addresses lying entirely within the invalidation range. Hence, with this option page table entries which only lie partially within the range would not be affected. The control circuitry may use tag information within each cache entry to identify whether the corresponding entry maps entirely or partially onto the claimed range, for example the combination of the address tag and a size field within each cache entry may be used. For range based invalidations, the mapping onto the range may not be the only criteria used to determine whether to invalidate, for example, other criteria may include the context identifier matching a context identifier associated with a current process which issued the invalidation request, or invalidation requests could specify certain levels of the page table structure which are to be affected by the invalidation, with other levels being excluded from the invalidation. Similarly some invalidation requests could target only entries that are associated with stage 1 or stage 2 in a multi-stage translation. The range associated with a range-specifying invalidation request could be identified in different ways, for example with explicit start and end addresses, or with a start address and a size field specifying the size of the invalidation range.

Some invalidation requests may target specific levels of page table entries in a multi-level page table structure. However, often it may be desired to distinguish leaf page table entries from intermediate page table entries (or non-leaf page table entries). A leaf page table entry may refer to the final level of the page table which specifies the actual address translation mapping used to translate one type of addresses into another type of addresses. Depending on whether the page table corresponds to stage 1, stage 2 or a combined stage 1/stage 2, the leaf page table entry may provide a mapping from virtual addresses to intermediate physical addresses, intermediate physical addresses to physical addresses, or virtual addresses to physical addresses directly. On the other hand, an intermediate page table entry may not provide any actual address mapping, but may simply specify an address of the next level page table entry in the page table structure. By targeting only leaf page table entries, this may allow the actual final address mappings to be invalidated, while leaving the higher levels of the page table structure intact if these do not need to be changed. Other invalidations may target all levels of the page table regardless of whether they are intermediate or leaf page table entries.

However, in one example the invalidation request may be an exclusive range-specifying invalidation request which targets both leaf and intermediate page table entries which correspond to a group of addresses lying entirely within the invalidation range. In response to a leaf-and-intermediate exclusive range-specifying invalidation request, the control circuitry may detect as the target cache entries any cache entries which depend on leaf or intermediate page table entries for blocks of addresses lying entirely within the invalidation range. This type of invalidation request can be very useful for enabling an entire branch of the page table structure to be invalidated in one request, while leaving other branches of the page table structure intact. Hence, at least one intermediate page table entry which corresponds to a group of addresses lying at least partially outside the invalidation range may be excluded from the at least one target page table entry whose address translation data is invalidated from the address translation cache. This approach can be particularly useful for system memory management units or address translation caches where multiple levels of walk caching is employed, where different entries of the address translation cache may correspond to different levels of page tables.

FIG. 1 schematically illustrates an example of a data processing apparatus 2 including one or more address translation caches. The apparatus 2 includes a number of master devices 4, 6 which in this example include two central processing units (CPUs) 4 and an input/output unit 6 for controlling input or output of data from/to a peripheral device. It will be appreciated that many other types of master devices could also be provided, such as graphics processing units (GPUs), a display controller for controlling display of data on a monitor, direct memory access controllers for controlling access to memory, etc. At least some of the master devices may have internal data or instruction caches 8 for caching instructions or data local to the device. Other masters such as the input/output interface 6 may be uncached masters. Coherency between data in the respective caches and accessed by the respective masters may be managed by a coherent interconnect 10 which tracks requests for accesses to data from a given address and controls snooping of data in other masters' caches when required for maintaining coherency. It will be appreciated that in other embodiments such coherency operations could be managed in software, but a benefit of providing a hardware interconnect 10 for tracking such coherency is that the programmers of the software executed by the system do not need to consider coherency.

As shown in FIG. 1, some masters may include a memory management unit (MMU) 12 which may include at least one address translation cache for caching address translation data used for translating addresses specified by the software into physical addresses referring to specific locations in memory 14. It is also possible to provide a system memory management unit (SMMU) 16 which is not provided within a given master device, but is provided as an additional component between a particular master 6 and the coherent interconnect 10, for allowing simpler master devices which are not designed with a built-in MMU to use address translation functionality. In other examples the SMMU 16 could be considered part of the interconnect 10.

Figure 2:
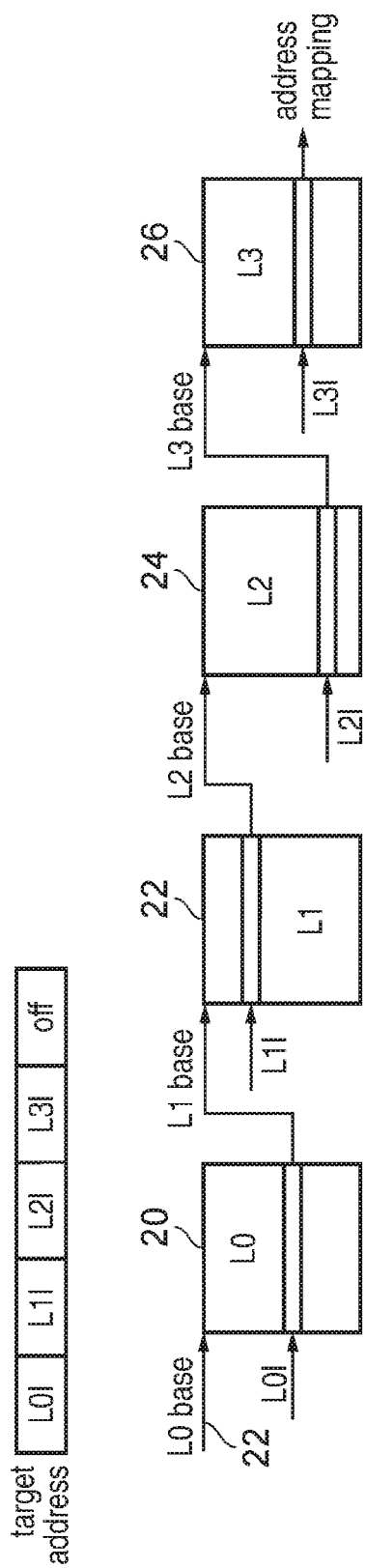
FIG. 2 shows an example of a multi-level page table walk operation to locate an address mapping for translating a given address.

Page tables may be defined within the memory 14 for storing the address translation mappings for blocks of addresses across a given address space. As shown in FIG. 2, the page tables may be implemented in multiple levels of page tables, which may be traversed in a page table walk operation to identify the address mapping for a particular target address. As shown in FIG. 2, a given set of index bits L0I may be used to index into a level zero page table 20 whose location in memory is identified by a level zero (L0) base address 22. The L0 base address 22 may be stored in a register of the (S)MMU 12, 16 for example. The indexed entry of the L0 table 20 identifies an L1 base address identifying the location in memory of an L1 page table 22. A different subset of index bits L1I from the target address selects one of the entries of the L1 page table 22, which then identifies an L2 base address identifying the memory location of a L2 page table 24. Another subset of index bits L2I from the target address indexes into the L2 page table 24, to identify an L3 base address which identifies the location of an L3 page table 26. Yet another subset of bits L3I of the target address then selects a particular entry of the L3 page table 26 which provides the actual address mapping for mapping the target address into a translated address such as a physical address. Hence, the L3 page table 26 is the final page table providing leaf page table entries which provide the actual address mapping information and the higher level page tables 20, 22, 24 provide intermediate entries which identify the base address of a next level page table. It will be appreciated that providing four levels of page table is just one example and others could use different numbers of page tables. By splitting page tables into different levels in this way, the total amount of memory storage required for storing the entire page table structure can be reduced because it is not necessary to locate the address mappings for translating a given amount of address space in a region or memory having the equivalent size to the address size being mapped, exploiting the fact that often large chunks of the address space do not have any mappings defined yet by the operating system or other process setting the address translation data. While FIG. 2 shows an example where the index bits L0I, L1I etc. are used directly as the index for selecting a corresponding page table entry, the index could also be the result of a hash function applied to the index bits.

In some systems, an (S)MMU 12, 16 may have entirely separate address translation caches for translating entries from different levels of the page table. Typically, the cache which caches entries from the final level page table 26 may be referred to as a translation lookaside buffer, while caches which cache higher level page table entries from page tables 20, 22, 24 may be referred to as walk caches. On the other hand, other embodiments may provide a shared address translation cache which can cache address translation data from multiple levels of the page table. Either approach can be used in the present technique. While one cache is described below, some (S)MMUs may include multiple levels of address translation cache in a cache hierarchy, to trade off capacity against access latency (e.g. a smaller numbers of entries stored in a level 0 address translation cache for fast access, and a larger number of entries stored in a level 1 address translation cache for slower access in the event of a miss in the level 0 address translation cache).

Figure 3:
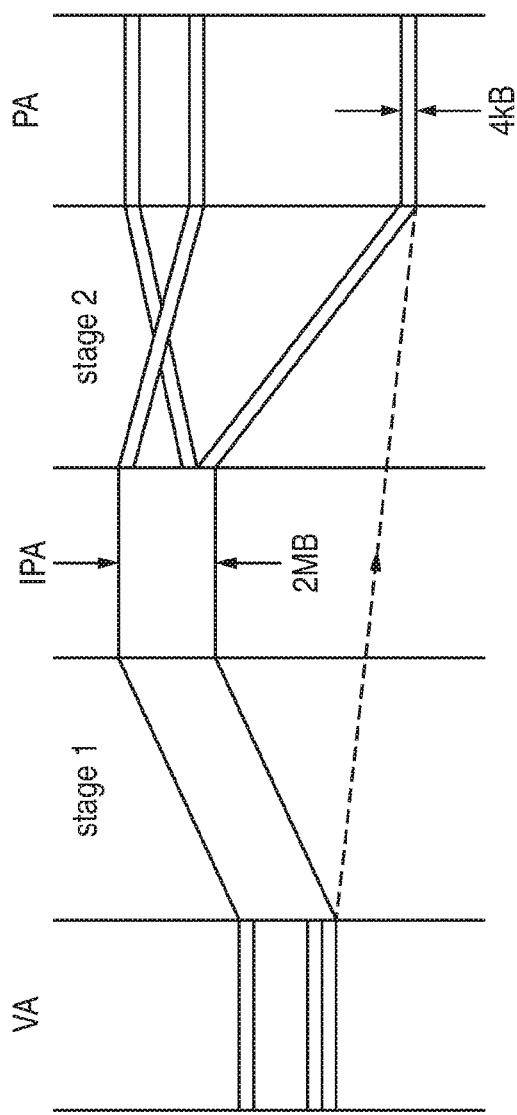
FIG. 3 shows an example of a two-stage address translation process.

As shown in FIG. 3, the address translation process may also involve multiple stages of address translation between different address spaces. For example, virtual addresses (first addresses) used to identify memory locations by the instructions executed by an application or operating system running on a CPU 4 may be translated into intermediate physical addresses (second addresses) in a stage 1 translation. The configuration data for controlling the stage 1 address may be set by the operating system for example. From the operating system's point of view the intermediate physical addresses generated in the stage 1 address translation may be assumed to be the physical addresses of the actual memory addresses being accessed. However, to support virtualisation and prevent identical intermediate physical addresses used by different operating systems coexisting on the same device from conflicting, a hypervisor may then provide a further second stage address translation between the intermediate physical addresses (second addresses) and physical addresses (third addresses) actually referring to the memory locations to be read or written in memory 14. Hence there may be a second set of page tables defined by the hypervisor corresponding to the stage 2 address translation.

Note that each of the two stages of address translation may use multiple levels of page tables as shown in FIG. 2. Hence, a full page table walk to identify an address mapping for a given block of addresses identified by a target virtual address may require each of the base addresses for the page tables used in the stage 1 address translation to go through the stage 2 address translation before accessing the corresponding level of the stage 1 page table. That is, the full page table walk process may include accessing the multiple levels of page tables in the following sequence:

Stage 2 translation of the base address of the stage 1 level 0 page table into a physical address (the stage 1 level 0 base address is typically an intermediate physical address because the stage 1 translations are configured by the operating system). The stage 2 translation comprises 4 lookups (stage 2, level 0; stage 2, level 1; stage 2, level 2; stage 2, level 3).

Stage 1 level 0 lookup based on the level 0 index portion L0I of the target virtual address to identify the stage 1 level 1 base address (an intermediate physical address)

Stage 2 translation of the stage 1 level 1 base address into a physical address (again, comprising 4 lookups).

Stage 1 level 1 lookup based on the level 1 index portion L1 I of the target virtual address to identify the stage 1 level 2 base address (an intermediate physical address)

Stage 2 translation of the stage 1 level 2 base address into a physical address (again comprising 4 lookups)

Stage 1 level 2 lookup based on the level 2 index portion L2I of the target virtual address to identify the stage 1 level 3 base address (an intermediate physical address)

Stage 2 translation of the stage 1 level 3 base address into a physical address (again comprising 4 lookups).

Stage 1 level 3 lookup based on the level 3 index portion L3I of the target virtual address to identify the target intermediate physical address corresponding to the target virtual address Stage 2 translation of the target intermediate physical address into the target physical address which represents the location in memory to access corresponding to the original target virtual address (again, comprising 4 lookups).

Hence, without any caching, the translation would comprise 24 lookups in total. As can be seen from the above sequence, performing the entire page table walk process can be very slow as it may require a large number of accesses to memory to step through each of the levels of page tables for each of the stages of address translation. This is why it is often desirable to cache not only the final level address mapping but also entries from higher level page tables of the stage 1 and the stage 2 tables within the (S)MMU 12, 16. This can allow at least some steps of the full page table walk to be bypassed even if the final level address mapping for a given target address is not currently in the address translation cache.

As shown in FIG. 3, it is possible for the stage 1 and stage 2 address translations to provide page table entries which map to different sizes of blocks of addresses. For example the stage 1 address translation may operate with a block size of 2 MB and the stage 2 address translation may operate with a block size of 4 kB (clearly the specific sizes 4 kB and 2 MB are just an example, but we will refer to these sizes below for ease of understanding—more generally any different page sizes could be used in the stage 1 and stage 2 tables). If the stage 1 and stage 2 address translations are implemented using separate address translation caches, or with separate stage 1 and stage 2 entries in a shared cache, then there may be a one-to-one mapping between page table entries and address translation cache entries for both stage 1 and stage 2. However, in systems which combine the stage 1 and stage 2 address translations into a single combined cache entry for translating virtual addresses directly into physical addresses, the larger page size for stage 1 than for stage 2 means that each 4 kB page of the stage 2 address translation will require a different cache entry to be allocated, but all the 4 kB pages in the same 2 MB block may correspond to the same stage 1 page table entry. Hence, a single page of the stage 1 translation may be fragmented between multiple entries of the combined stage 1/stage 2 cache. This means that when a change is made to a stage 1 page table entry, a corresponding cache invalidation may require multiple combined stage 1/stage 2 cache entries to be invalidated, each corresponding to a different 4 kB blocks within the 2 MB page. This means that an invalidation can no longer be performed using a cache indexing mode where a selected set of entries is identified based on the target address and the tags in that set of entries compared with a tag associated with a target address to determine which entries to invalidate. Instead, as multiple entries may hit against the target address, a cache walk mode may be required where all the entries within at least a portion of the cache are accessed regardless of the address, and then each of the tags in the accessed entries compared with the tag of the target address to determine whether that entry should be invalidated. Such a cache walk mode may be more expensive in terms of latency and power consumption than the cache indexing mode.

Figure 4:
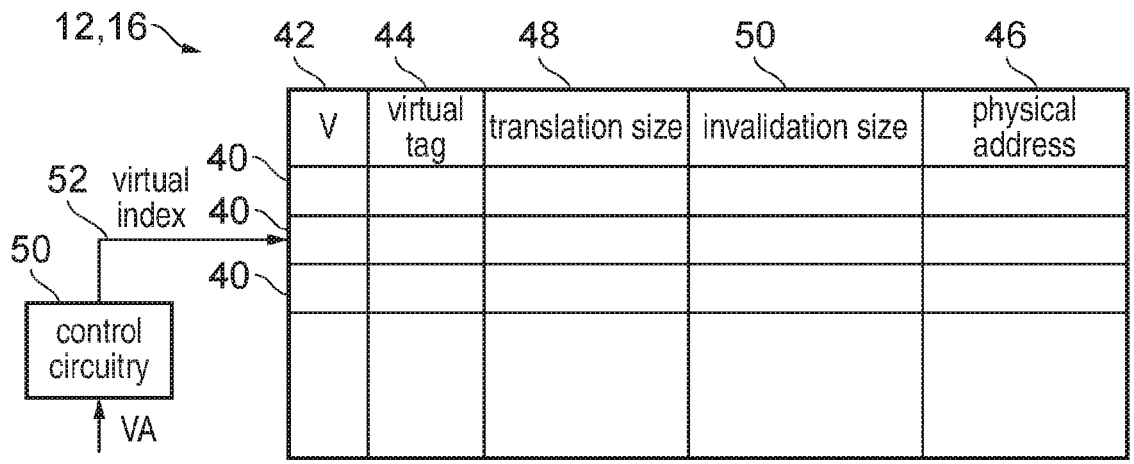
FIG. 4 shows an example of entries of an address translation cache.

FIG. 4 shows an example of an address translation cache supporting combined stage 1/stage 2 address translations. The cache 12, 16 includes a number of entries 40 for storing address translation data. Each entry includes a valid bit 42 specifying whether the entry contains valid address translation data, a virtual tag 44 specifying a portion of the virtual address corresponding to the block of addresses for which the address translation data applies, and a corresponding physical address 46. For non-leaf translation entries, the physical address 46 may specify the address of the next level page table entry in the page table structure, while for leaf entries (e.g. the level 3 page table), the physical address may identify the actual translated address into which the virtual page address is to be translated.

In this example, the cache supports variable page sizes and so a translation size field 48 specifies the size of the block of addresses to which the corresponding address translation mapping applies. Also, as this is a combined stage 1/stage 2 cache mapping virtual addresses directly to physical addresses (without going via intermediate physical addresses), the entry 40 also specifies an invalidation size 50 which represents the size of the group of addresses for which, if an invalidation target address falls within that invalidation group of addresses, the corresponding address translation data in the entry 40 should be invalidated, even if the target address is not within the range specified by the translation size 48. This enables, for example a combined stage 1/stage 2 entry to be invalidated even when the address falls outside the 4 KB range of that entry, because the target address falls within the same 2 MB page associated with a stage 1 page table entry on which the address translation mapping from virtual tag 44 to physical address 46 depends. Also, both the stage 1 and the stage 2 page tables could have variable page sizes for different pages within the address space.

Figure 5:
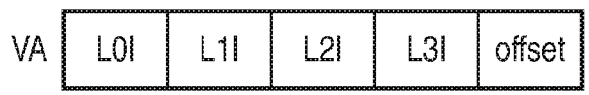
FIG. 5 shows an example of using different parts of a virtual address to index into the address translation cache.

As shown in FIG. 4, control circuitry 50 is provided for controlling access to the address translation cache 12, 16 and also for controlling invalidations of address translation data. Part of the virtual address is used by the control circuitry 50 to generate an index for selecting the corresponding set cache entries to be accessed in a cache indexing lookup mode. Which bits of the virtual address are used to form the index depends on the level of the page table entry being accessed, as shown in FIG. 5. Also, in embodiments which support multiple different translation block sizes 48, the particular subset of bits used for accessing a given level may vary depending on the block size, so to access address translation data for a given address it may be required to try multiple lookup modes each corresponding to a different block size and hence a different selection of index bits from the virtual address. For a given lookup mode, once the index 52 has been generated and the corresponding set of one or more cache entries 40 accessed, the control circuitry 50 compares the tag 44 stored in each accessed entry with a tag portion of the virtual address (typically the bits of the virtual address that are more significant than the portion used for the index). If the tags do not match then the entry 40 does not store relative address translation data for the current target address. The size of the tag compared may depend on the translation size 48 for address translation lookup and on the invalidation size 50 for an invalidation lookup. Although not shown in FIG. 4, address lookups may also depend on other information stored in each entry, such as a context identifier which identifies a particular translation contact associated with the address translation data. Cache lookups may be considered to hit only when the context identifier in the matching cache entry is the same as the context identifier associated with address lookup or invalidation request.

The example of FIG. 4 shows a virtually indexed and tagged address translation cache which translates directly to a physical address. Other examples may provide a dedicated stage 1 address translation cache, in which case the translated address field 46 may provide an intermediate physical address instead of a physical address, or a dedicated stage 2 address translation cache, in which case the cache may be indexed and tagged by intermediate physical address instead of virtual address.

Figure 6:
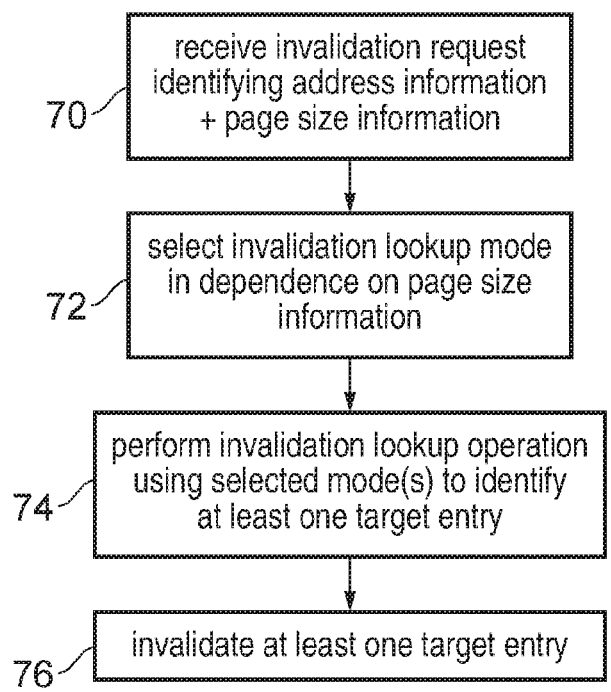
FIG. 6 shows a flow diagram showing a method of handling an invalidation request.

FIG. 6 shows a flow diagram illustrating a method of performing an invalidation lookup for the address translation cache in response to an invalidation request. At step 70 the control circuitry 50 receives an invalidation request. For example the invalidation request may be triggered by an invalidation instruction executed by one of the CPUs 4. The invalidation request specifies address information corresponding to at least one target page table entry to be invalidated. For example the address information can simply specify the start address of one page to be invalidated, or could correspond to a range of addresses so that a number of pages within that range are to be invalidated. The invalidation request also specifies page size information explicitly or implicitly identifying the size of each page to be invalidated.

Figure 7:
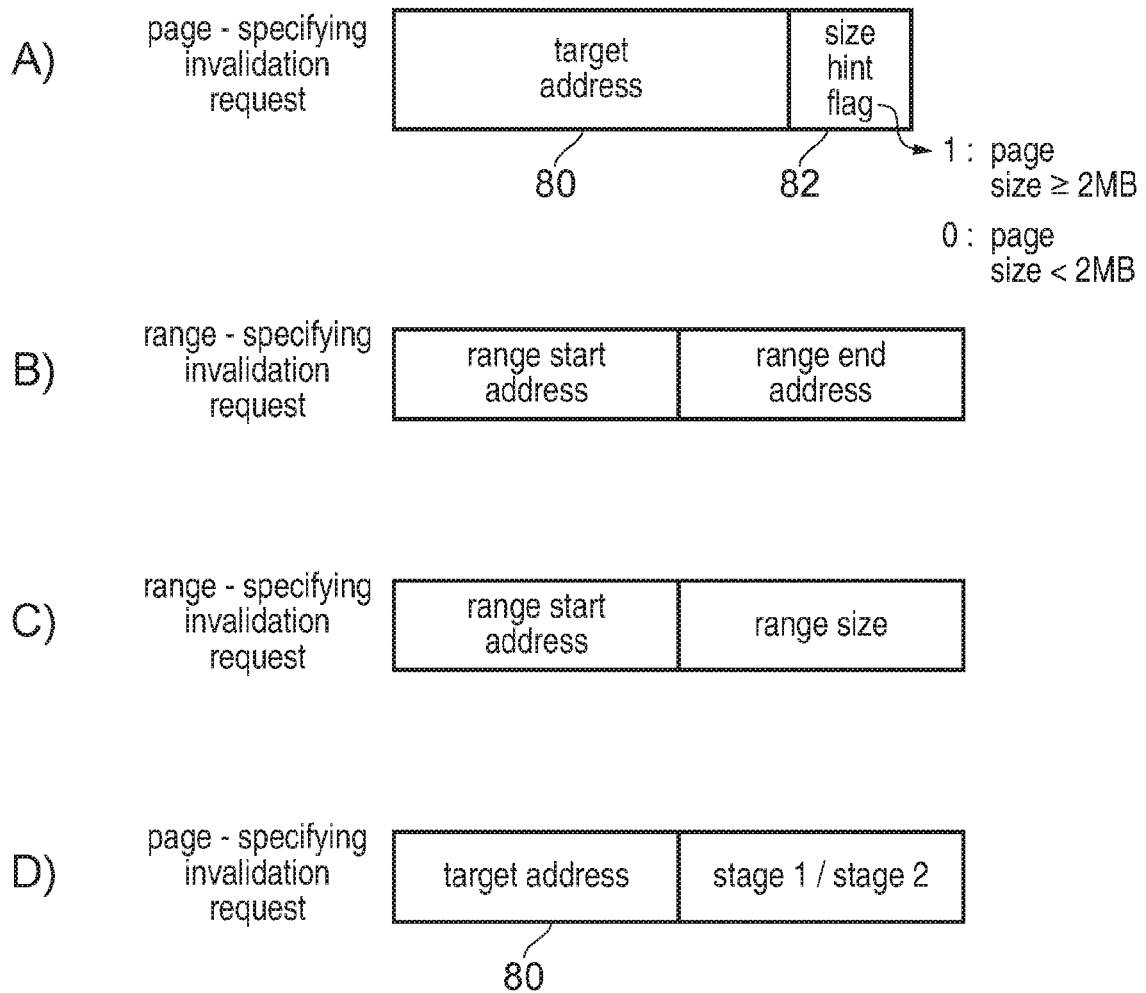
FIG. 7 shows four different examples of providing page size information.

FIG. 7 shows different examples of how the page size information could be represented. In example A, the invalidation request specifies a single target address 80 of a target page of the page tables to be invalidated, together with a size hint flag 82 providing the page size information. The size hint flag indicates whether or not the page size of the target page is greater than or less than a given threshold. For example the threshold can be the size of the pages in the one of the stage 1 or stage 2 page tables that has the larger page size, for example 2 MB in the example given above. For example the size of flag may be 1 when page size is greater than or equal to the threshold and 0 if the page size is less than the threshold.

Example B of FIG. 7 shows another example where a range-specifying invalidation request specifies a range start address and a range end address identifying the start and end points of the range within which page table entries are to be invalidated. For an exclusive range-specifying invalidation request (which targets pages lying entirely within the specified range), the page size information may be implicit since it can be determined that the maximum page size possible is less than or equal to the size of the range. Similarly, example C shows a range specifying invalidation request where, instead of an end address, a range size is specified, and in this case the page size may be determined to be less than or equal to the range size.

Alternatively, for an inclusive range-specifying invalidation request which targets entries of the page tables for which any part of the corresponding group of addresses overlaps with the range, the page size may not be implicit from the range size alone, and in this case the range specifying invalidation requests of examples B and C could be appended with a similar size hint flag 82 as shown in example A, or using another representation of the page size.

Example D of FIG. 7 shows another example where the invalidation request specifies a single target address 80 of a page to be invalidated, and also specifies whether the invalidation relates to stage 1 or stage 2. In embodiments where some page sizes are used by only one of the stage 1 and the stage 2 page tables, a simple one-bit flag specifying whether the invalidation relates to the stage 1 or the stage 2 can be enough to limit the possible page sizes which could apply. It will be appreciated that even for the examples A-C where the stage 1 and stage 2 translation is not shown in FIG. 7, these requests could still specify which stage the translation relates to so that the appropriate invalidation can be carried out.

A number of other examples can also be used to represent the page size information. For example the page size could be explicitly specified as an actual numerical value identifying the page size, or as a code which represents one of multiple options for the page size. Also a bitmap could be provided comprising one or more bits set or cleared depending on which page sizes are applicable to a given invalidation. The page size could be represented in terms of an upper bound or a lower bound for the page size, so does not need to explicitly represent the actual page size. It is enough to specify some information which allows at least some potential page sizes to be eliminated.

Figure 8:
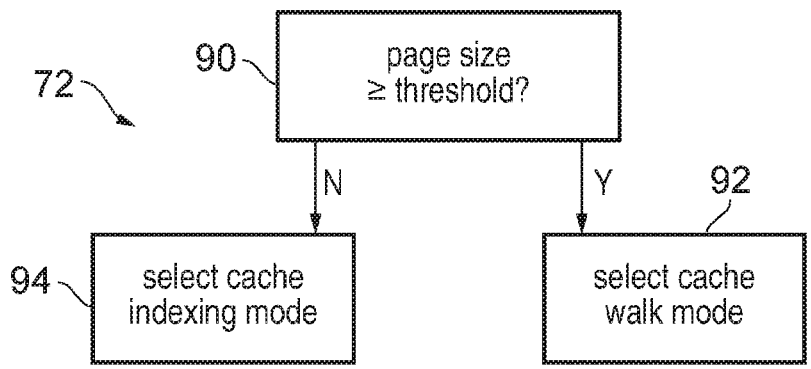
FIG. 8 is a flow diagram showing a method of selecting an invalidation lookup mode based on the page size information.

Returning to FIG. 6, at step 72 the control circuitry 50 selects an invalidation lookup mode to use for the invalidation request based on the page size information. FIG. 8 shows one example of the selection of the invalidation lookup mode. At step 90 the control circuitry determines from the page size information whether the page size is greater than or equal to a given threshold. For example, this could be based on whether the size hint flag 82 discussed above is set to 1 or 0. If the page size is greater than or equal to the threshold, then at step 92 a cache walk mode is selected, which is a mode in which a given subset of cache entries (or even all of the cache entries 40) are selected for access regardless of the current target address information of the invalidation request, each of the selected entries is accessed and the tag 44 or other information in the entry 40 compared with the address information or other parameters of the invalidation request to determine whether that entry hits against the target address. When the page size is greater than the threshold in a combined stage 1/stage 2 address translation cache, then there is a risk that one page table entry could be fragmented across multiple cache entries and so a cache indexing mode may not be enough to identify all of the entries needed to be invalidated. In contrast, when the page size associated with the invalidation request is less than the threshold, then this may indicate that the page size is sufficiently small that there is no risk of the fragmentation of a target page table entry across multiple cache entries, and so a cache indexing mode is selected at step 94. In the cache indexing mode, a set of entries is selected based on the target address and only the entries within the selected set (selected based on the index 52) is accessed. As discussed below for FIG. 9, in some cases multiple cache indexing modes for different block sizes may be selected at step 94. A cache index mode is typically more efficient than the cache walk mode. Hence, even when there are combined stage 1 and stage 2 entries resident within the cache 4, by considering the page size information it is not necessary to use the cache walk mode 92 for all invalidations of the combined stage 1/stage 2 translation cache, and the cache indexing mode 94 can be used when invalidations which only affect a smaller page size.

The example of FIG. 8 is useful for a combined stage 1/stage 2 cache. It is not necessary to use the method shown in FIG. 8 for all invalidations. For example, the control circuitry 15 may maintain status register which may specify whether any combined stage 1/stage 2 entries have been allocated to the cache. When only separate stage 1 and stage 2 entries have been allocated to separate cache entries 40, the cache indexing mode 94 could always be used. However, once at least one combined stage 1/stage 2 entry which maps directly from virtual addresses to physical addresses has been allocated to the cache, the control circuitry 50 may use the method of FIG. 8 to limit the use of the cache walk mode to cases when the invalidation affects a page size greater than the threshold.

Figure 9:
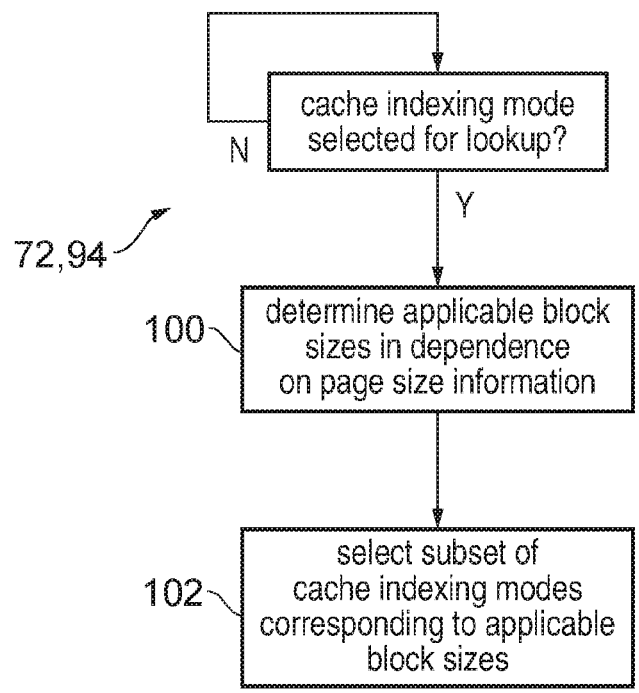
FIG. 9 shows a second example method of selecting an invalidation lookup mode based on the page size information.

FIG. 9 shows a second example of selecting the invalidation lookup mode. This method can be performed at step 72 of FIG. 6 (without also performing the method of FIG. 8), or could be part of selecting the cache indexing mode at step 94 of FIG. 8. At step 100 the control circuitry determines a set of applicable block sizes based on the page size information of the invalidation request. For example, the system may support multiple different size pages of the page tables e.g. 4 kB, 8 kB, 16 kB, 32 kB, etc. The control circuitry may determine from the page size information that certain block sizes for entries in the cache are not possible. For example, if the page size information identified that the page size is less than 2 MB then block sizes larger than this could be discounted. Similarly, for exclusive range specifying invalidation requests it may be implicit from the size of the range that certain block sizes are not possible. Normally, if an address translation cache contains multiple size of entries simultaneously then it would perform several lookups for all active sizes. Using the page size information, some of these lookups can be eliminated as unnecessary to reduce power and latency. Hence, at step 102 a subset of cache indexing modes corresponding to the applicable block sizes determined at step 100 are selected for the invalidation lookup.

Hence, returning to FIG. 6, at step 74 one or more invalidation lookup operations are performed for the selected lookup mode(s) determined at step 72 using either of the methods of FIGS. 8 and 9. At least one target entry is identified based on the invalidation lookup operation and at step 76 the address translation data in the at least target entries is invalidated.

Figure 10:
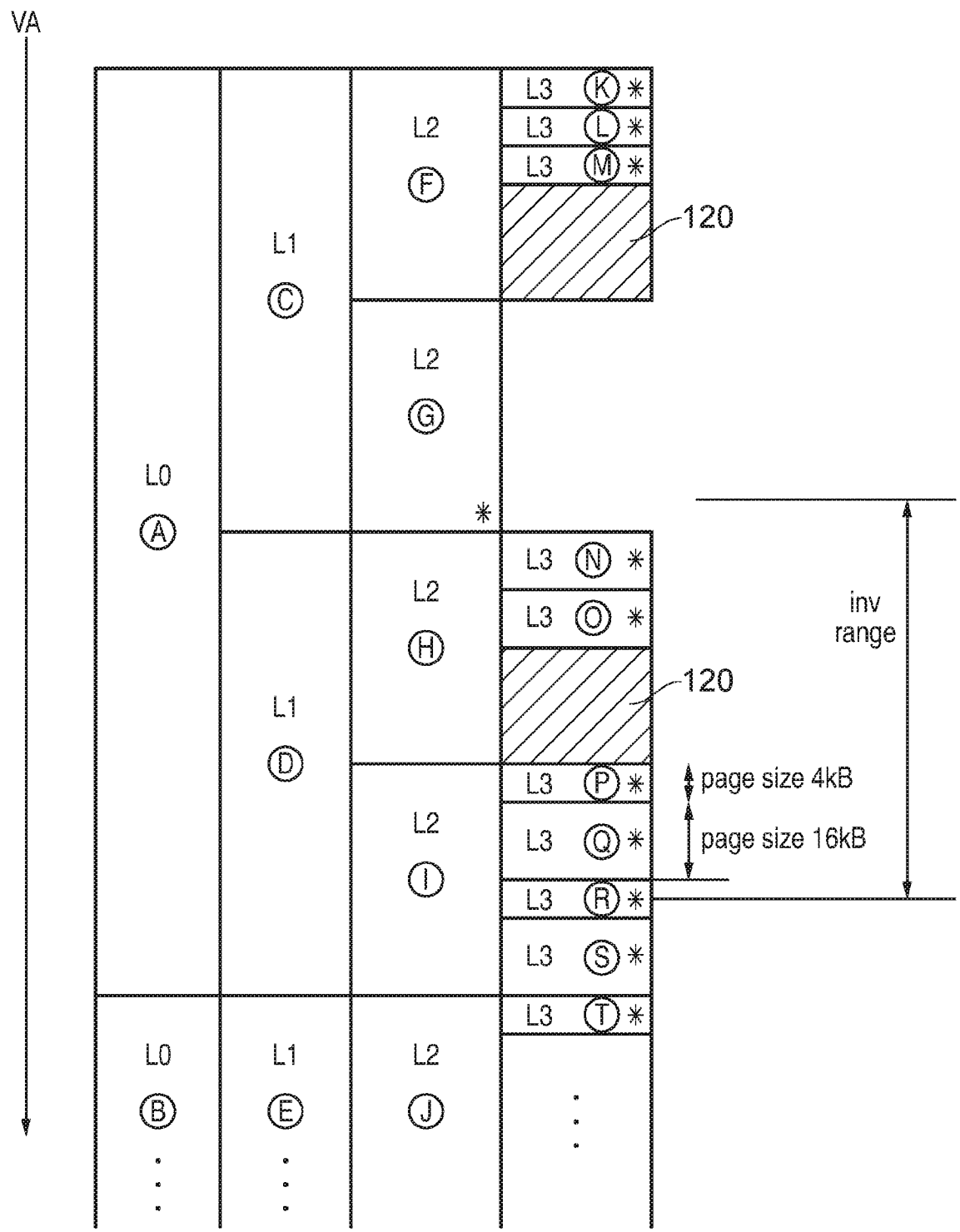
FIG. 10 illustrates different options for selecting which page table entries are targeted by a range-specifying invalidation request.

For a range-specifying invalidation request, a number of options are available for controlling which target entries of the page tables are affected by the invalidation, and hence which cache entries 40 are invalidated. FIG. 10 shows an example illustrating how page table entries from different levels of the page tables correspond to different regions of the virtual address space. For example, a single level 0 page table entry A may map to a larger region of the address space than a number of level 1 page table entries C, D within the range covered by the level 0 entry. For conciseness FIG. 10 shows only two entries of the level 1 page table corresponding to one entry of the level 0 page table, but it will be appreciated that in practice one level 0 entry may correspond to a greater number of level 1 entries. Similarly, the portion of the address data represented by one level 1 page table entry C may map to a number of level 2 page table entries F, G and one level 2 page table entry F may map to a number of level 3 page table entries K, L, M. It is not necessary for all portions of the address space to be mapped. For example there are some regions 120 as shown in FIG. 10 which do not have any address mapping defined. If a CPU 4 or master 6 attempts to access one of these addresses then this may trigger an exception which causes an operating system or other software to allocate an address and then retry the operation. The entries marked with an asterisk in FIG. 10 are leaf entries which provide an actual address translation mapping. Note that it is possible for leaf entries to be at different levels. For example the level 2 page table entry G in FIG. 10 provides the actual address mapping for a certain block of addresses, but level 3 page table entries provide the leaf entries for other parts of the address space. For example, if a certain block of the address space corresponding to the level 2 page size all requires the same address mapping, then it can be more efficient to use the level 2 entry to provide the leaf entry rather than allocating a number of identical level 3 entries. The other entries not marked with an asterisk are intermediate or non-leaf entries which do not provide an address mapping, but instead provide an address of the next level page table entry.

As shown in FIG. 10, different page table entries may correspond to different sized blocks of addresses. For example, level 3 entry P corresponds to 4 kB while level 3 entry Q corresponds to 16 kB. This is why it can be useful to specify the translation size within the cache as shown in FIG. 4, and why it may be required to have a number of different invalidation lookup modes using different sized index and tag portions corresponding to the different possible sizes of the translation range which can map onto a given virtual address.

For range-specifying invalidations there are a number of options available for identifying which entry should be affected by the range. For example, FIG. 10 shows an example of a certain invalidation range specified by a range-specifying invalidation request. Different types of invalidation request may target different sets of page table entries, for example:

an exclusive range-specifying invalidation request may target only the entries which lie completely within the specified range, and may not target any entries which only lie partially in the range;

an inclusive range-specifying invalidation request may target entries which lie partly or entirely within the range, so even those entries which only lie partially within the range are still targeted by invalidation;

leaf invalidation requests may target only the leaf entries and may not affect intermediate entries of page tables;

leaf-and-intermediate invalidation may affect both leaf and non-leaf (intermediate) entries.

Different combinations of these options may be defined. For example, in FIG. 10 an exclusive leaf invalidation within the range shown would target entries N, O, P, Q which are leaf entries entirely within the specified range, but entry R would not be invalidated because it lies only partially within the range and entry H would also not be invalidated because it is an intermediate entry, not a leaf entry. An inclusive range invalidation would also target entry R for example.

One particular type of invalidation which can be provided is an exclusive leaf-and-intermediate invalidation, which targets those page table entries which lie completely within the specified range and which can be either leaf entries or non-leaf entries. For example, if an exclusive leaf-and-intermediate invalidation is performed using the range shown in FIG. 10, then this would target entries H, N, O, P, Q which all lie completely within the invalidation range and are either a leaf or a non-leaf entry. Such an invalidation can be very useful for enabling an entire branch of the page table tree to be invalidated in one operation, while leaving higher levels of the tree intact because they extend at least partially outside the specified invalidation range.

In summary, the techniques discussed above enable performance to be improved for invalidations from an address translation cache, e.g. a translation lookaside buffer (TLB). In a combined stage1+2 TLB, a stage 1 translation can be larger than a stage 2 translation, leading to e.g. a page being fragmented across many TLB locations. A single invalidate instruction by virtual address would normally be expected to invalidate a single TLB entry, but in this case it needs to invalidate many entries. When such entries are present in a TLB, the cache can switch to a mode where every invalidate operation must walk the entire TLB contents. This is very slow, especially for large TLBs. As discussed above, software may indicate the size of the page to be invalidated for invalidation requests, and the cache hardware may use this information to avoid walking the full TLB for small entries, and only walks the TLB for entries if the size is at least as large as the stage 1 block size of a fragmented entry in the TLB. E.g. if a block is 2 MB in stage 1 but maps to 4 KB pages in stage 2, only invalidations of 2 MB or larger cause a walk of the full TLB; other invalidations can progress as "fast" invalidations using a cache indexing lookup mode as normal.

Knowledge of the page size also enables the number of lookups in the TLBs to be optimised in implementations which permit a number of different block and page sizes to be simultaneously stored. If a TLB contains multiple sizes of entry simultaneously then it performs several lookups. Whereas a normal lookup can stop after a hit, invalidations would require look ups of all active sizes. Reducing the search space therefore speeds up invalidation.

When a range is specified, it can enable intermediate walk caches to be intelligently invalidated. Range invalidations can be defined as "leaf" or "non-leaf", with non-leaf invalidations must invalidate L0, L1 and L2 walk cache entries if present, while leaf may only target the final level L3 entries. The fragmented nature of many translation scenarios, especially as seen by SMMU, leads to multiple levels of walk cache being implemented. Hence, invalidation operations may be specified by range, and each walk cache level may be invalidated only if the range is large enough to encompass the entries in that level.

Sometimes a range of blocks are to be invalidated, e.g. a range of 16 2 MB blocks where the page granule is 4 KB. It is useful to be able to specify a range of pages to invalidate, instead of issuing a series of commands, to minimise the communication time with the TLBs. Over-invalidation, using an invalidate all command, is undesirable, because of the impact to real-time users of the TLB, or other TLBs. Invalidate by range operations are provided which also have a minimum page size parameter, to avoid the need to look at cache entries below that size. E.g. in the previous example, 16 2 MB block entries can be looked up, without having to look for all the possible 4 KB entries, thus saving TLB bandwidth, and time.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
   an address translation cache comprising a plurality of cache entries, each cache entry to store address translation data dependent on one or more page table entries of one or more page tables stored in a memory system; and
   control circuitry responsive to an invalidation request specifying address information corresponding to at least one target page table entry, to perform an invalidation lookup operation to identify at least one target cache entry of the address translation cache for which the address translation data is dependent on said at least one target page table entry, and to trigger invalidation of the address translation data stored in said at least one target cache entry;
   wherein the control circuitry is configured to select which of a plurality of invalidation lookup modes to use for the invalidation lookup operation in dependence on page size information indicative of a page size of said at least one target page table entry, the plurality of invalidation lookup modes corresponding to different ways of identifying said at least one target cache entry in dependence on the address information.

2. The apparatus according to claim 1, wherein the invalidation lookup modes comprise:
   a cache indexing mode for which the invalidation lookup operation comprises indexing into at least one selected cache entry of the address translation cache selected based on the address information, and determining whether each selected cache entry is one of said at least one target cache entry; and
   a cache walk mode for which the invalidation lookup operation comprises accessing at least a subset of cache entries of the address translation cache selected independently of the address information, and determining whether each accessed cache entry is one of said at least one target cache entry.

3. The apparatus according to claim 2, wherein the control circuitry is configured to select the cache indexing mode when the page size information indicates that the page size is smaller than a threshold size, and to select the cache walk mode when the page size information indicates that the page size is greater than the threshold size.

4. The apparatus according to claim 1, comprising processing circuitry to configure a stage 1 page table for controlling translation of first addresses into second addresses, and to configure a stage 2 page table for controlling translation of the second addresses into third addresses;
   wherein the address translation cache is configured to store combined address translation data for controlling translation of the first addresses directly into the third addresses.

5. The apparatus according to claim 1, wherein each cache entry is configured to store address translation data for translating a block of addresses having one of a plurality of different block sizes supported by the address translation cache.

6. The apparatus according to claim 5, wherein said plurality of invalidation lookup modes comprise a plurality of cache indexing modes for selecting a cache entry to be accessed in dependence on the address information specified by the invalidation request, each indexing mode corresponding to a different block size;

wherein in response to the invalidation request, the control circuitry is configured to select a subset of the plurality of cache indexing modes in dependence on the page size information and to trigger one or more invalidation lookup operations corresponding to the selected subset of the plurality of cache indexing modes.

7. The apparatus according to claim 1, wherein said page size information comprises at least one of:

an explicit indication of the page size;
    an upper bound for the page size;
    a lower bound for the page size;
    an indication of whether the page size is less than a threshold size;
    an indication of whether the page size is greater than a threshold size;
    start and end addresses of an address translation range specified by the address information;
    information identifying a subset of applicable page sizes selected from a plurality of page sizes; and
    an indication of one of a plurality of stages of address translation associated with the invalidation request.

8. The apparatus according to claim 1, wherein said page size information is specified by the invalidation request.

9. The apparatus according to claim 1, wherein the invalidation request comprises an address-specifying invalidation request for which the address information specifies a single address for identifying said at least one target page table entry.

10. The apparatus according to claim 1, wherein the invalidation request comprises a range-specifying invalidation request for which the address information specifies an invalidation range of addresses and said at least one target page table entry comprises at least one page table entry corresponding to a group of addresses lying at least partially within said invalidation range.

11. The apparatus according to claim 10, wherein in response to an inclusive range-specifying invalidation request, said at least one target page table entry comprises one or more page table entries corresponding to a group of addresses for which any part of the group of addresses lies within said invalidation range.

12. The apparatus according to claim 10, wherein in response to an exclusive range-specifying invalidation request, said at least one target page table entry comprises one or more page table entries corresponding to a group of addresses lying entirely within said invalidation range.

13. The apparatus according to claim 1, wherein each page table entry comprises one of:

an intermediate page table entry specifying an address of a next level page table entry; and
    a leaf page table entry specifying an address translation mapping.

14. The apparatus according to claim 12, wherein each page table entry comprises one of:

an intermediate page table entry specifying an address of a next level page table entry; and
    a leaf page table entry specifying an address translation mapping; and
    in response to a leaf-and-intermediate exclusive range-specifying invalidation request, said at least one target page table entry comprises any leaf page table entries of a given page table and any intermediate page table entries of said given page table which correspond to a group of addresses lying entirely within said invalidation range.

15. The apparatus according to claim 14, wherein in response to the leaf-and-intermediate exclusive range-specifying invalidation request, said at least one target page table entry excludes an intermediate page table entry of said given page table which corresponds to a group of addresses lying at least partially outside said invalidation range.

16. A method for invalidating address translation data from an address translation cache comprising a plurality of cache entries, each cache entry to store address translation data dependent on one or more page table entries of one or more page tables stored in a memory system, the method comprising:

in response to an invalidation request specifying address information corresponding to at least one target page table entry:

performing an invalidation lookup operation to identify at least one target cache entry of the address translation cache for which the address translation data is dependent on said at least one target page table entry, wherein which of a plurality of invalidation lookup modes is used for the invalidation lookup operation is selected in dependence on page size information indicative of a page size of said at least one target page table entry, the plurality of invalidation lookup modes corresponding to different ways of identifying said at least one target cache entry in dependence on the address information; and
        triggering invalidation of the address translation data stored in said at least one target cache entry.

17. An apparatus comprising:

an address translation cache comprising a plurality of cache entries, each cache entry to store address translation data dependent on one or more page table entries of one or more page tables stored in a memory system, wherein each page table entry comprises one of:

an intermediate page table entry specifying an address of a next level page table entry; and
    a leaf page table entry specifying an address translation mapping; and control circuitry responsive to a leaf-and-intermediate exclusive range-specifying invalidation request identifying range information indicative of an invalidation range of addresses, to trigger invalidation of at least one target cache entry of the address translation cache for which the address translation data is dependent on at least one target page table entry, said at least one target page table entry comprising any leaf page table entries of a given page table and any intermediate page table entries of said given page table which correspond to a group of addresses lying entirely within said invalidation range.

* * * * *